United States Patent
Perich et al.

(10) Patent No.: US 12,372,980 B2
(45) Date of Patent: Jul. 29, 2025

(54) MULTI-AXIS UPSET RECOVERY SYSTEM

(71) Applicant: Rockwell Collins, Inc., Cedar Rapids, IA (US)

(72) Inventors: John P. Perich, Duluth, MN (US); Brandon J. Burnett, Cedar Rapids, IA (US); Juan M. Segal, Cedar Rapids, IA (US); Andrew R. Markofski, Cedar Rapids, IA (US); Samuel E. Ferdon, Cedar Rapids, IA (US); Thomas M. Scanlon, Cedar Rapids, IA (US); John W. Roltgen, Cedar Rapids, IA (US); Dale E. McPherson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 36 days.

(21) Appl. No.: 18/228,123

(22) Filed: Jul. 31, 2023

(65) Prior Publication Data

US 2025/0044807 A1 Feb. 6, 2025

(51) Int. Cl.
*G05D 1/495* (2024.01)
*G05D 109/22* (2024.01)

(52) U.S. Cl.
CPC ......... *G05D 1/495* (2024.01); *G05D 2109/22* (2024.01)

(58) Field of Classification Search
CPC .............. G05D 1/495; G05D 2109/22; G05D 1/0808; G05D 1/08; G05D 1/0816
See application file for complete search history.

(56) References Cited

U.S. PATENT DOCUMENTS

| | | | |
|---|---|---|---|
| 6,236,914 B1* | 5/2001 | Kaloust | G05D 1/0816 |
| | | | 701/34.2 |
| 6,282,466 B1 | 8/2001 | Nolte et al. | |
| 6,965,816 B2 | 11/2005 | Walker | |
| 7,088,264 B2 | 8/2006 | Riley | |
| 7,852,235 B1 | 12/2010 | Johnson et al. | |
| 8,015,390 B1 | 9/2011 | Corcoran et al. | |
| 8,217,807 B1 | 7/2012 | Carrico | |
| 8,255,098 B2 | 8/2012 | Jones et al. | |
| 8,423,206 B2 | 4/2013 | Shapiro et al. | |
| 8,690,101 B2 | 4/2014 | Ahmad et al. | |

(Continued)

FOREIGN PATENT DOCUMENTS

EP 3203343 A1 8/2017

OTHER PUBLICATIONS

"Advisory Circular 120-111 Change 1", https://www.faa.gov/documentLibrary/media/Advisory_Circular/AC_120-111_CHG_1.pdf; published Jan. 4, 2017.

(Continued)

*Primary Examiner* — Thomas Ingram
(74) *Attorney, Agent, or Firm* — Suiter Swantz IP

(57) ABSTRACT

Autonomous systems increase the robustness and safety of current aircraft and to support simplified vehicle, reduced crew, and single pilot operations. The autonomous systems aid air crews in their handling of non-normal, high workload, aircraft upset scenarios. The upset scenarios include the recovery from attitudes outside of the normal operating envelope that even the most robust automatic flight control systems currently in service today do not support.

17 Claims, 10 Drawing Sheets

(56) References Cited

U.S. PATENT DOCUMENTS

| | | |
|---|---|---|
| 8,938,356 B1 | 1/2015 | Bell et al. |
| 9,043,043 B1 | 5/2015 | Gribble et al. |
| 9,440,747 B1* | 9/2016 | Welsh ................. G05D 1/0061 |
| 9,529,362 B1 | 12/2016 | Bhattacharyya et al. |
| 9,612,985 B1 | 4/2017 | Kovalan et al. |
| 9,830,829 B1 | 11/2017 | Doyen et al. |
| 9,870,712 B1 | 1/2018 | Weichbrod |
| 9,938,018 B2 | 4/2018 | Welsh et al. |
| 10,362,117 B1 | 7/2019 | Nelson |
| 10,691,139 B1 | 6/2020 | Perich et al. |
| 10,723,480 B1 | 7/2020 | McCusker et al. |
| 10,759,544 B2 | 9/2020 | Mills et al. |
| 10,809,743 B1* | 10/2020 | McCusker ............. B64C 13/18 |
| 11,150,653 B1 | 10/2021 | Fannin et al. |
| 11,292,606 B1 | 4/2022 | Perich et al. |
| 2011/0276200 A1* | 11/2011 | Ishihara ................. G01C 23/00 |
| | | 701/9 |
| 2012/0303186 A1* | 11/2012 | Puig ..................... G01C 23/005 |
| | | 701/18 |
| 2018/0267560 A1* | 9/2018 | Zhu .......................... B64C 13/16 |
| 2019/0056901 A1* | 2/2019 | He ............................ G06F 3/147 |
| 2019/0378419 A1* | 12/2019 | Gansmandel ......... B64C 13/503 |
| 2021/0072769 A1* | 3/2021 | Flanzer .................. B64C 13/16 |
| 2021/0179259 A1* | 6/2021 | Ho .......................... B64C 13/16 |
| 2021/0331790 A1* | 10/2021 | Worsham ............. G05D 1/0858 |
| 2022/0197236 A1 | 6/2022 | Krawiec et al. |

OTHER PUBLICATIONS

Luis G. Crespo, et al. "Analysis of Control Strategies for Aircraft Flight Upset Recovery"; American Institute of Aeronautics and Astronautics, pp. 1-31, publication date unknown.

* cited by examiner

500

| 502 PITCH HIGH UPSET |

| 504 PITCH LOW UPSET |

| 506 ROLL HIGH UPSET |

| 508 LEVEL OFF |

| 510 ENOUGH SPEED |

| 512 STABLIZED |

| 1002 ROLL |

| 1004 CLIMB |

| 1006 UNLOAD / PULL |

| 1008 AIRSPEED AND ANGLE-OF-ATTACK |

| 1010 ELEVATOR |

| 1012 STATE |

FIG. 10

MULTI-AXIS UPSET RECOVERY SYSTEM

TECHNICAL FIELD

The present invention generally relates to systems for controlling aircraft, and more specifically to systems for controlling the aircraft during unusual attitudes.

BACKGROUND

With the demand for air travel only increasing, and a desire for lower cost and safer flights, the aviation industry is moving towards reducing pilot workload by increasing automation. A particular focus is on how automation can be used to aid the pilot in non-normal, high workload, and potentially dangerous situations.

One specific area of concern is aircraft upsets (defined by AC 120-111), which can lead to loss of control in-flight (LOC-I) accidents. In AC 120-111, an Aircraft Upset is defined as an airplane in flight unintentionally exceeding the following parameters: Pitch attitude greater than 25 degrees nose up; Pitch attitude greater than 10 degrees nose down; Bank angle greater than 45 degrees; Within the above parameters but flying at airspeeds inappropriate for the conditions.

Airline pilots are recurrently trained to recover from an upset. Yet, there have been cases where system anomalies have caused pilots to respond incorrectly, leading to airplanes upsets and even crashes (Colgan 3407, Air France 447). Environment conditions and spatial disorientation can also cause pilots to respond incorrectly to an aircraft upset, which can worsen the situation (A380 wake turbulence).

As Reduced Crew Operations and even Single Pilot Operations increase, the need for systems with increased capability and robustness in response to events that could cause an upset will be required. Therefore, it would be advantageous to provide a device, system, and method that cures the shortcomings described above.

SUMMARY

A processing circuit is described. The processing circuit includes a memory maintaining program instructions. The processing circuit includes one or more processors configured to execute the program instructions. The program instructions cause the one or more processors to recover an aircraft from a pitch high upset when an absolute value of a roll angle ($\varphi$) is less than a maximum roll threshold. The program instructions cause the one or more processors to recover the aircraft from the pitch high upset in combination with a roll high upset. The program instructions cause the one or more processors to recover the aircraft from a pitch low upset when the absolute value of the roll angle ($\varphi$) is less than the maximum roll threshold. The program instructions cause the one or more processors to recover the aircraft from the pitch low upset in combination with the roll high upset. The program instructions cause the one or more processors to recover the aircraft from the roll high upset when a pitch angle ($\theta$) is within a minimum pitch threshold and a maximum pitch threshold.

The program instructions cause the one or more processors to trigger the pitch high upset when the pitch angle ($\theta$) is greater than the maximum pitch threshold. The program instructions cause the one or more processors to trigger the pitch low upset when the pitch angle ($\theta$) is less than the minimum pitch threshold. The program instructions cause the one or more processors to trigger the roll upset when the absolute value of the roll angle ($\varphi$) is greater than the maximum roll threshold.

Recovering the aircraft from the pitch high upset when the absolute value of the roll angle ($\varphi$) is less than the maximum roll threshold and recovering the aircraft from the pitch high upset in combination with the roll high upset each comprise unloading the aircraft; rolling the aircraft to a select roll angle, increasing a throttle, and stowing one or more speed brakes each in response to unloading the aircraft; decreasing the throttle and rolling the aircraft to wings level each as a function of the pitch angle ($\theta$) as the pitch angle ($\theta$) decreases to horizon; and pulling the aircraft to a level flight in response to the pitch angle ($\theta$) being at or below horizon.

The select roll angle is greater than the maximum roll threshold.

Recovering the aircraft from the pitch low upset when the absolute value of the roll angle ($\varphi$) is less than the maximum roll threshold and recovering the aircraft from the pitch low upset in combination with the roll high upset each comprise unloading the aircraft; rolling the aircraft to wings level in response to unloading the aircraft; and pulling the aircraft to a level flight in response to the pitch angle ($\theta$) of the aircraft being at wings level.

Recovering the aircraft from the pitch low upset when the absolute value of the roll angle ($\varphi$) is less than the maximum roll threshold and recovering the aircraft from the pitch low upset in combination with the roll high upset each comprise: rolling the aircraft to wings level, decreasing a throttle, and extending one or more speed brakes each in response to unloading the aircraft.

Recovering the aircraft from the roll upset when the pitch angle ($\theta$) is within the minimum pitch threshold and the maximum pitch threshold comprises unloading the aircraft; rolling the aircraft to wings level in response to unloading the aircraft; and pulling the aircraft to a level flight in response to the pitch angle ($\theta$) of the aircraft being at wings level.

The program instructions cause the one or more processors to unload the aircraft by causing one or more elevators to adjust the pitch angle ($\theta$).

Unloading the aircraft refers to reduces a load factor (n) to within a load factor threshold.

The program instructions cause the one or more processors to roll the aircraft by causing one or more ailerons to adjust the roll angle ($\varphi$).

The program instructions cause the one or more processors to pull the aircraft to a level flight by causing one or more elevators to adjust the pitch angle ($\theta$); wherein pulling the aircraft to the level flight causes the pitch angle ($\theta$) to increase.

The program instructions cause the one or more processors to recover the aircraft to a stabilized condition.

The stabilized condition occurs when an absolute value of the pitch angle ($\theta$) is less than a stabilized pitch threshold; the absolute value of the roll angle ($\varphi$) is less than a stabilized roll angle threshold; an absolute value of a roll rate (p) is less than a stabilized roll rate threshold; an absolute value of a pitch rate (q) is less than a stabilized pitch rate threshold; a normal acceleration in the z-axis (Nz) is between a stabilized minimum acceleration and a stabilized maximum acceleration; and an Inertial Vertical Speed (HDOT) is greater than zero.

The program instructions cause the one or more processors to execute an upset recovery manager; wherein the upset recovery manager is a state-based machine.

The upset recovery manager comprises a roll controller, a climb controller, an unload/pull controller, an airspeed and angle-of-attack controller, an elevator controller, and a state controller.

An aircraft is described. The aircraft includes a throttle. The aircraft includes one or more control surfaces comprising one or more rudders; one or more elevators; and one or more ailerons. The aircraft includes a processing circuit. The processing circuit includes a memory maintaining program instructions. The processing circuit includes one or more processors configured to execute the program instructions.

The program instructions cause the one or more processors to recover the aircraft from a pitch high upset when an absolute value of a roll angle ($\varphi$) is less than a maximum roll threshold. The program instructions cause the one or more processors to recover the aircraft from the pitch high upset in combination with a roll high upset. The program instructions cause the one or more processors to recover the aircraft from a pitch low upset when the absolute value of the roll angle ($\varphi$) is less than the maximum roll threshold. The program instructions cause the one or more processors to recover the aircraft from the pitch low upset in combination with the roll high upset. The program instructions cause the one or more processors to recover the aircraft from the roll high upset when a pitch angle ($\theta$) is within a minimum pitch threshold and a maximum pitch threshold.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5 depicts a simplified block diagram of conditions of an aircraft, in accordance with one or more embodiments of the present disclosure.

FIG. 10 depicts a simplified block diagram of an upset recovery manager, in accordance with one or more embodiments of the present disclosure.

DETAILED DESCRIPTION OF THE INVENTION

Figure 1:
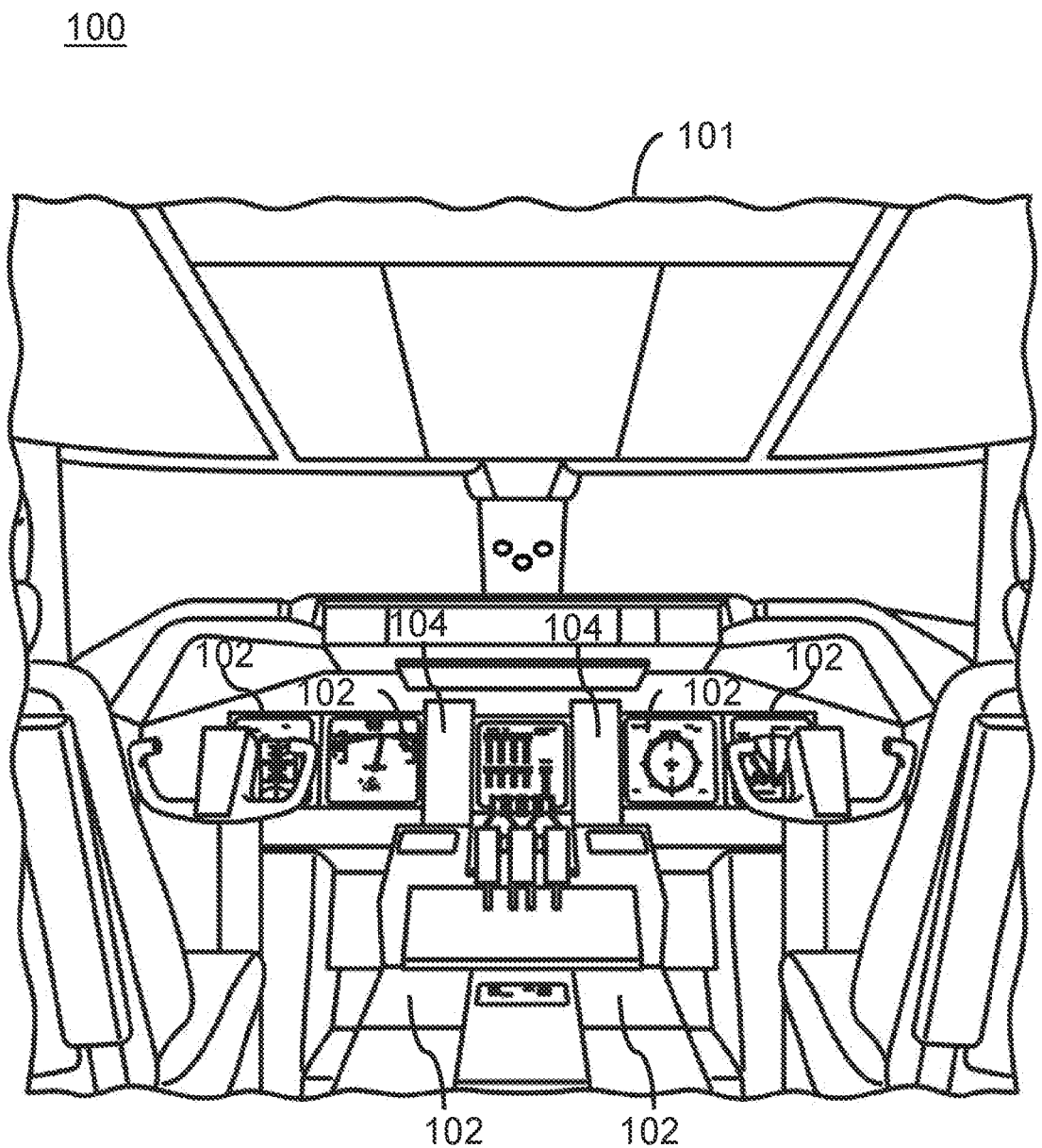
FIG. 1 depicts a perspective view of cockpit of an aircraft, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a multi-axis upset recovery system. The multi-axis upset recovery system provides an automated method to recover the aircraft from an unusual attitude upset.

The automated method includes control algorithms in the pitch, roll, and yaw axis as well as control of pitch trim and thrust/drag. These control algorithms are governed by state logic to utilize the correct techniques at the proper time. The commands are expressed as a multiple stage maneuver of controlling the pitch axis of the aircraft to reduce the wing load, rolling to level flight, and controlling the pitch axis to level flight. In addition to pitch and roll maneuvers provided by the system to recover the aircraft; the system complements the pitch and roll control (manually with a cue or automatically) with drag and thrust adjustments, yaw damping, and automatic pitch trim.

The system provides consistent responses to scenarios that may otherwise result in inconsistent pilot response due to the severity and rareness of the events. Furthermore, the presence of this automation reduces the workload for the crew. The system includes functionality to recover the aircraft from unusual attitudes and upset conditions that either supplements or replaces crew action thus enhancing the overall safe operation of the system. For example, the system may either display an annunciation with the procedure to recover or cause one or more control surfaces to automatically recover from the unusual attitude.

Once enabled, either pilot activated or through automatic detection, the upset recovery system uses attitude and Angle-of-Attack (AoA) data in real time to recover the aircraft to straight and level flight. Using these same inputs, state logic determines the order of and which set of corrective actions are needed to recover from the upset. This way, the system can recover an upset aircraft from a range of upset conditions, including stall, while maintaining the airframe's structural integrity.

U.S. Pat. No. 11,292,606, titled "Systems and methods of airspeed control with dynamic asymmetric airspeed reference"; U.S. Pat. No. 11,150,653, titled "Autopilot availability for reduced crew operations system and method"; U.S. Pat. No. 7,852,235, titled "High integrity computing via input synchronization systems and methods"; U.S. Pat. No. 8,690,101, titled "Triplex cockpit control data acquisition electronics"; U.S. Pat. No. 8,015,390, titled "Dissimilar processor synchronization in fly-by-wire high integrity computing platforms and displays"; U.S. Pat. No. 10,691,139, titled "Systems and methods for altitude capture performance monitor"; U.S. Pat. No. 9,612,985, titled "Synchronization mechanisms for high-integrity computing"; U.S. Pat. No. 8,938,356, titled "Tactical flight data validating systems and methods for a multi-channel topological architecture"; U.S. Patent Pub. No. 2022/0197236, titled "Hierarchical high integrity automation system"; U.S. Pat. No. 10,723,480, titled "System and method for prevention and recovery from high altitude stalls"; U.S. Pat. No. 10,809,743, titled "System and method for recovery from wake vortex encounters"; U.S. Pat. No. 9,043,043, titled "Autonomous flight controls for providing safe mode navigation"; U.S. Pat. No. 9,830,829, titled "Management system and methods for implementing aircraft intentions harmonization"; U.S. Pat. No. 9,870,712, titled "Time and spatial based flight selection system and method"; U.S. Pat. No. 8,217,807, titled "Operational flight phase determination and indication system"; U.S. Pat. No. 9,529,362, titled "Autonomous aircraft operating system, device, and method"; U.S. Pat. No. 10,362,117, titled "Systems and methods for modified network routing based on modal information"; are each incorporated herein by reference in the entirety.

Referring now to FIG. 1, a cockpit 101 of an aircraft 100 is shown according to some inventive concepts disclosed herein. The cockpit 101 includes one or more flight displays 102 and one or more user interface (UI) elements 104.

The flight displays 102 may be implemented using any of a variety of display technologies, including CRT, LCD, organic LED, dot matrix display, and others. The flight displays 102 may be navigation (NAV) displays, primary flight displays, electronic flight bag displays, synthetic vision system displays, head up displays (HUDs) with or without a projector, wearable displays, watches, and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information, which may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads, sidesticks, column, wheel, and pedals certified for use with avionics and aircraft systems. The UI elements 104 may be configured to, for example, allow one or more aircraft crew members to interact with various avionics applications and perform functions such as data entry, manipulation of navigational maps, and moving among and selecting checklist items. In some embodiments, the UI elements 104 may be used to provide a user input for adjusting one or more aircraft controls and/or a setting for configuring an aircraft control. For example, the UI elements 104 may be configured to receive an input relating to a desired airspeed, such as an airspeed reference value, threshold values, and the like. In this regard, the user input may be stored in a memory or data storage in some embodiments. The UI elements 104 may also (or alternatively) be used by an aircraft crew member to interface with or manipulate the displays of the flight displays 102. For example, the UI elements 104 may be used by an aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles. The UI elements 104, may also be used to arm, enable, activate/engage, and deactivate/disengage the Upset Recovery function.

Figure 2:
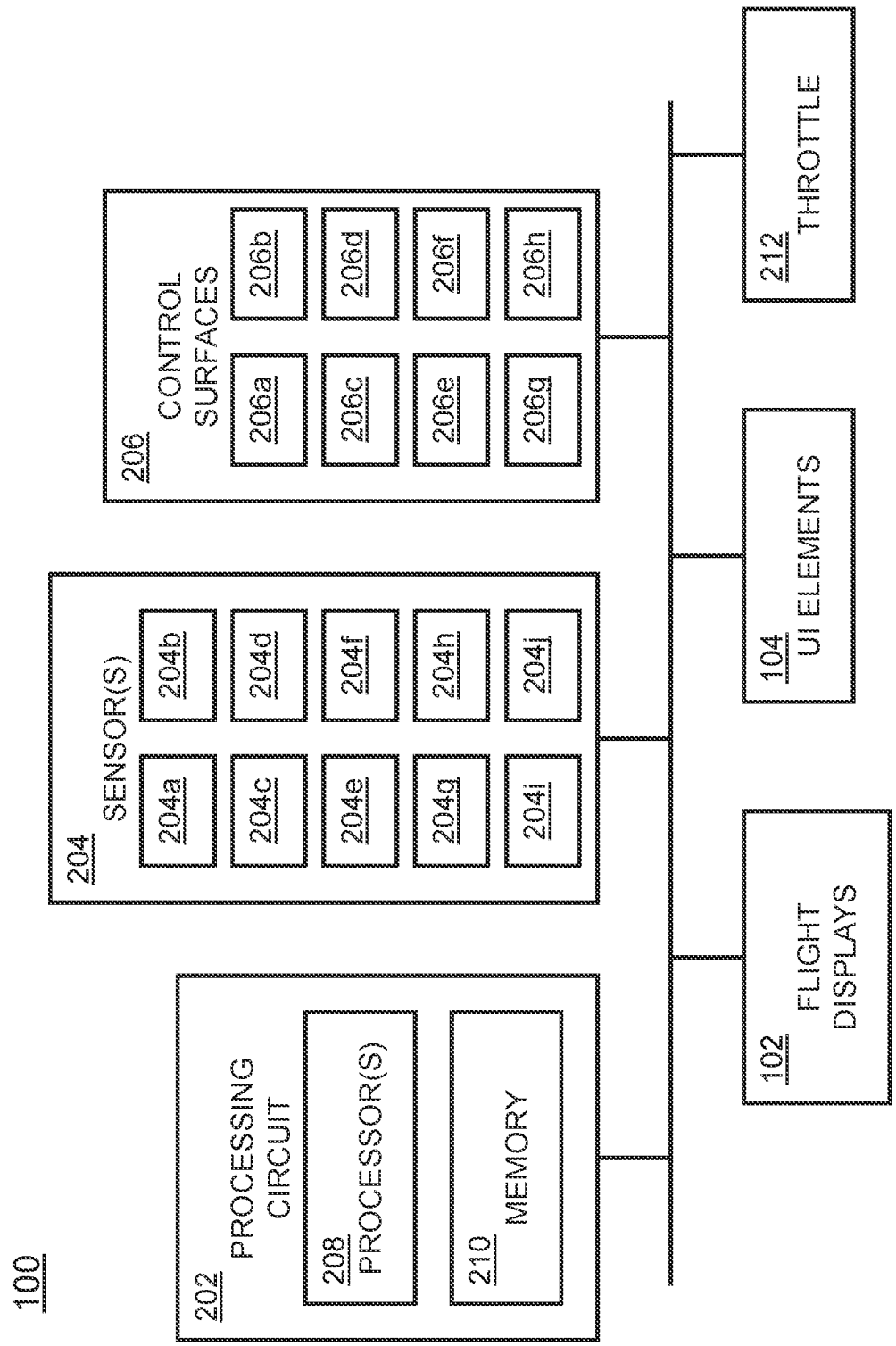
FIG. 2 depicts a simplified block diagram of an aircraft, in accordance with one or more embodiments of the present disclosure.

Referring now to FIG. 2, the aircraft 100 is described, in accordance with one or more embodiments of the present disclosure. The aircraft 100 includes the flight displays 102, the UI elements 104, processing circuit 202, sensors 204, control surfaces 206, throttle 212, and the like. As may be understood, the configuration of the aircraft 100 may vary.

The flight displays 102, UI elements 104, processing circuit 202, sensors 204, control surfaces 206, and throttle 212 (hereafter the various components) may be communicatively coupled. For example, the various components may be communicatively coupled by one or more networks. The one or more networks may include any wired network or wireless network. Each of the various components may include a network interface for communicating over the network interface. The network interface may include mechanical, electrical, or signaling circuitry for communicating data to and from the network and subsequently to the various components.

The aircraft 100 includes the processing circuit 202. The processing circuit 202 may also be referred to as one or more of an autopilot, autothrottle, flight control computer, and/or fly-by-wire computer.

The processing circuit 202 includes one or more processors 208 and a memory 210. The memory 210 maintains program instructions. The processors 208 are configured to execute the program instructions causing the one or more processors 208 to carry out the various steps described through the present disclosure. For example, the program instructions may cause the processors 208 to execute an upset recovery system. The upset recovery system may also be referred to as a multi-axis upset recovery system. The upset recovery system supports Reduced Crew Operations (RCO), Single Pilot Operations (SPO), and Full Autonomous (AUT).

The aircraft 100 includes the sensors 204. The sensors 204 may be in various positions on the aircraft 100. Data from the sensors 204 may be output to the processing circuit 202 (e.g., the processors 208), the flight displays 102, and the like. The processors 208 use the data from the sensors 204 during the execution of the upset recovery system. For example, the processors 208 use the data from the sensors 204 to recover the aircraft 100 from the upset recovery envelope to the normal operating envelope.

The aircraft 100 includes a yaw angle ($\psi$). The yaw angle ($\psi$) is the angle between north and the longitudinal axis of the aircraft 100. onto the horizontal plane. The yaw angle ($\psi$) may also be referred to as heading. The yaw angle ($\psi$) is zero when the aircraft 100 is pointed north.

The aircraft 100 includes a pitch angle ($\theta$). The pitch angle ($\theta$) is the angle between the longitudinal axis of the aircraft 100 and horizontal. The pitch angle ($\theta$) is zero when the aircraft 100 is pointed at horizon.

The aircraft 100 includes a roll angle ($\varphi$). The roll angle ($\varphi$) is the rotation around a longitudinal axis of the aircraft 100. The roll angle ($\varphi$) may also be referred to as a bank angle. The roll angle ($\varphi$) is zero when the aircraft 100 is wings level.

The aircraft 100 experiences a load factor (n). The load factor (n) refers to a force the aircraft 100 experiences in one or more axes. The load factor (n) is based on lift of the aircraft 100 over weight of the aircraft 100. A load factor (n) of 1 g refers to level flight where lift is equal to weight.

The aircraft 100 includes a load factor limit. The load factor limit is a maximum value for the load factor (n) which the aircraft 100 may not exceed. The load factor limit is selected based on structural considerations of an airframe of the aircraft 100.

The aircraft 100 includes a yaw rate (r). The yaw rate (r) refers to a rate of change of the yaw angle ($\psi$).

The aircraft 100 includes a roll rate (p). The roll rate (p) refers to a rate of change of the roll angle ($\varphi$).

The aircraft 100 includes a pitch rate (q). The pitch rate (q) refers to a rate of change of the pitch angle ($\theta$).

The aircraft 100 includes an altitude. The altitude refers to a height of the aircraft 100 over sea level.

The aircraft 100 includes an airspeed ($V_\infty$). The airspeed ($V_\infty$) refers to a speed of the aircraft 100 relative to air.

The aircraft 100 includes an angle-of-attack ($\alpha$). The angle-of-attack ($\alpha$) refers to an angle between the air and a reference line on the aircraft 100.

The sensors 204 may be configured to acquire various types of sensor data. For example, the sensors 204 may be configured to acquire yaw angle ($\psi$), roll angle ($\varphi$) pitch angle ($\theta$), load factor (n), yaw rate (r), roll rate (p), pitch rate (q), altitude, airspeed ($V_\infty$), and angle-of-attack ($\alpha$) of the aircraft 100.

The sensors 204 may include a yaw angle sensor 204a, roll angle sensor 204b, pitch angle sensor 204c, load factor sensor 204d, yaw rate sensor 204e, roll rate sensor 204f, pitch rate sensor 204g, altitude sensor 204h, an airspeed sensor 204i, and angle-of-attack sensor 204j, and the like. It is contemplated that the sensors 204 may include any sensor of the aircraft 100. The yaw angle sensor 204a, roll angle sensor 204b, pitch angle sensor 204c, load factor sensor 204d, yaw rate sensor 204e, roll rate sensor 204f, pitch rate sensor 204g, altitude sensor 204h, an airspeed sensor 204i, and angle-of-attack sensor 204j determine the yaw angle ($\psi$), roll angle ($\varphi$), pitch angle ($\theta$), load factor (n), yaw rate (r), roll rate (p), pitch rate (q), altitude, airspeed ($V_\infty$), and angle-of-attack ($\alpha$) respectively.

It is further contemplated that a single of the sensors 204 may be configured to acquire more than one type of sensor data. For example, the sensors 204 may include an inertial measurement unit (IMU). The inertial measurement unit (IMU) may include the yaw angle sensor, roll angle sensor, pitch angle sensor, load factor sensor, yaw rate sensor, roll rate sensor, and pitch rate sensor. The inertial measurement unit (IMU) may determine the yaw angle ($\psi$), roll angle ($\varphi$), pitch angle ($\theta$), load factor (n), yaw rate (r), roll rate (p), and pitch rate (q) of the aircraft 100. By way of another example, the sensors 204 may include a pitot-static system. The pitot-static system may include the altitude sensor and airspeed sensor. The pitot-static system may determine the altitude and airspeed ($V_\infty$) of the aircraft.

The aircraft 100 includes the control surfaces 206. The control surfaces 206 may include to any device designed to influence an attitude or trajectory of, or supply lift or drag to the aircraft 100. The control surfaces 206 may control movement of the aircraft 100 in one or more of the three angles of the aircraft 100 (yaw angle ($\psi$), pitch angle ($\theta$), roll angle ($\varphi$)). The processors 208 control the aircraft 100 via the control surfaces 206.

The control surfaces 206 includes one or more elevators 206a. The elevators 206a control the pitch angle ($\theta$) and pitch rate (q). The elevators 206a are raised to cause the pitch angle ($\theta$) to increase and aircraft 100 to pitch up. The elevators 206a are lowered to cause the pitch angle ($\theta$) to decrease and aircraft 100 to pitch down. The elevators 206a is controlled in terms of degrees. The program instructions cause the one or more processors 208 to unload the aircraft 100 by causing the one or more elevators 206a to adjust the pitch angle (θ). For example, the elevators 206a may be pushed to unload the Aircraft 100. Similarly, the program instructions cause the one or more processors 208 to pull the aircraft 100 by causing the one or more elevators 206a to adjust the pitch angle (θ). The aircraft 100 may include one or more horizontal stabilizers. The aircraft 100 includes elevator 206a disposed on each horizontal stabilizer.

The control surfaces 206 includes one or more ailerons 206b. The ailerons 206b control the roll angle (φ) and roll rate (p). The ailerons 206b are controlled in terms of degrees. The program instructions cause the one or more processors 208 to roll the aircraft 100 by causing the one or more ailerons 206b to adjust the roll angle (φ). The aircraft 100 includes one or more wings. The aircraft 100 includes aileron 206b disposed on each wing.

The control surfaces 206 includes one or more rudders 206c. The rudders 206c controls the yaw angle (ψ) and yaw rate (r). The program instructions cause the one or more processors 208 to yaw the aircraft 100 by causing the one or more rudders 206c to adjust the yaw angle (ψ). The aircraft 100 includes one or more vertical stabilizers. The aircraft 100 includes rudder 206c disposed on each vertical stabilizer.

The control surfaces 206 include one or more flaps 206d, slats 206e, and/or spoilers 206f. The flaps 206d, slats 206e, and spoilers 206f are disposed on each wing of the aircraft 100. The flaps 206d, slats 206e, and spoilers 206f influence the lift and drag of the aircraft 100. The spoilers 206f may also be used to control the roll angle.

The control surfaces 206 may also include one or more trims 206g. The trims 206g may include one or more elevator trims, one or more aileron trims, and/or one or more rudder trims. The elevator trims, aileron trims, and rudder trims adjust the forces on the elevator 206a, aileron 206b, and rudder 206c respectively.

The control surfaces 206 may also include one or more speed brakes 206h. The speed brakes 206h may also be referred to as air brakes. The speed brakes 206h increase a drag of the aircraft 100 and slow the speed of the aircraft 100.

The aircraft 100 includes a throttle 212. The throttle 212 controls an engine speed, thrust, and/or airspeed ($V_\infty$). The throttle 212 is controlled in terms of degrees. The throttle 212 is controlled based on feedback from the sensors 204.

Figure 3:
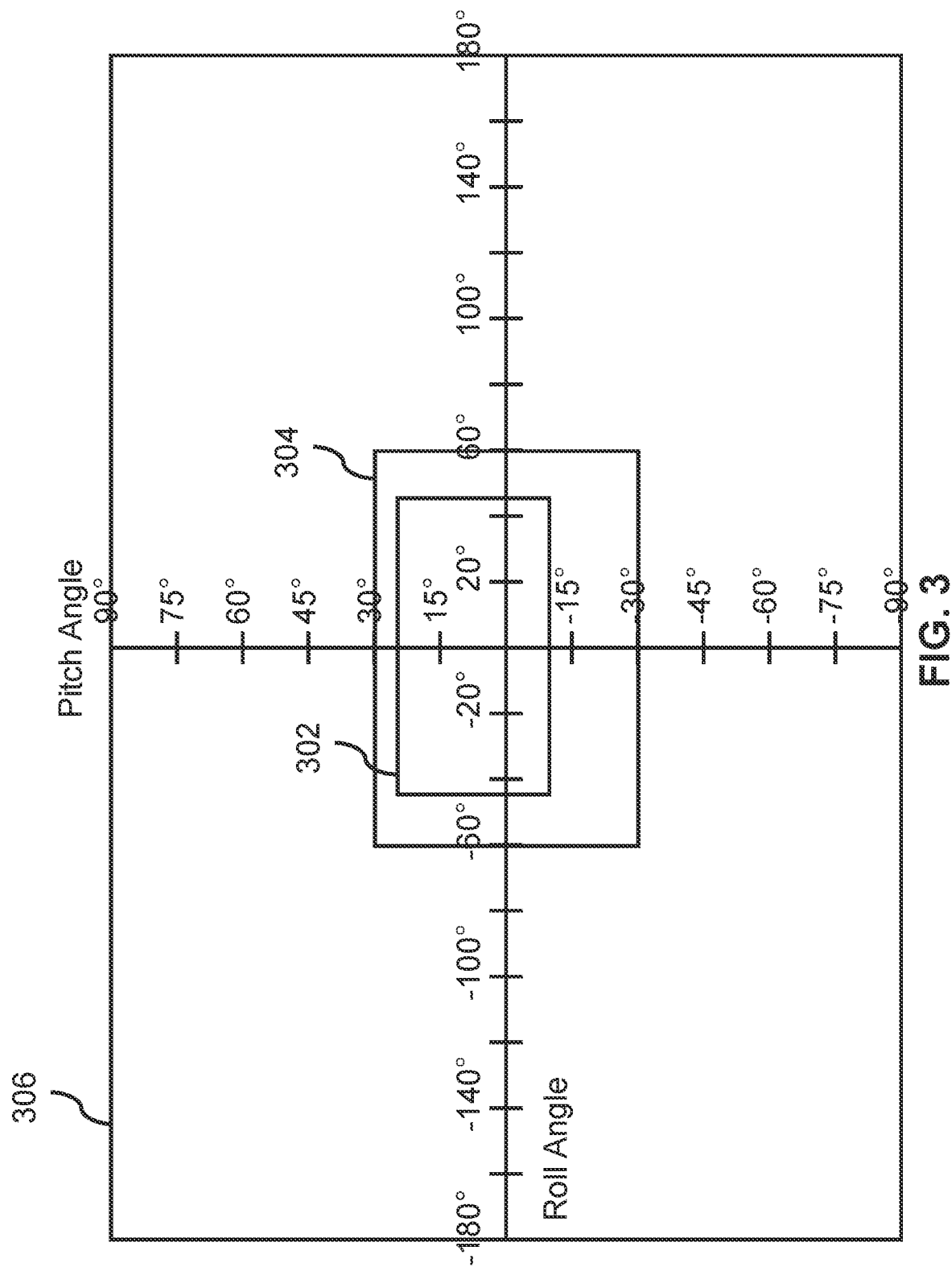
FIG. 3 depicts flight envelopes of an aircraft, in accordance with one or more embodiments of the present disclosure.

Referring now to FIG. 3, flight envelopes are described, in accordance with one or more embodiments of the present disclosure. A flight envelope refers to the capabilities of the aircraft 100 with respect to the roll angle (φ) and pitch angle (θ) of the aircraft 100.

Exemplary flight envelopes are now described for the aircraft 100. The flight envelopes include a normal operating envelope 302, a normal operating envelope 304, and an upset recovery envelope 306. The normal operating envelope 302 for a private pilot refers to a pitch from +25° to −10° and a roll from +/−45°. The normal operating envelope 302 for the private pilot is 4.9% of the total envelope. The normal operating envelope 304 for the air transport pilot (ATP) refers to a pitch from +/−30° and a roll from +/−60°. The normal operating envelope 304 for the air transport pilot (ATP) is 11.1% of the total envelope. The upset recovery envelope 306 refers to a pitch from +/−90° and a roll from +/−180°. The upset recovery envelope 306 is 100% of the flight envelope. The specific values in degrees for the roll and pitch are exemplary and are not intended to be limiting.

For example, the memory 210 maintains the aircraft 100 as being an air transport pilot class of aircraft. The processors 208 implement the upset recovery system to recover the aircraft 100 from the upset recovery envelope 306 to the normal operating envelope 304 for the air transport pilot class of aircraft. The processors 208 implement the upset recovery system to recover the aircraft 100 from the upset recovery envelope 306 to the normal operating envelope 302 for the private pilot class of aircraft.

Figure 4:
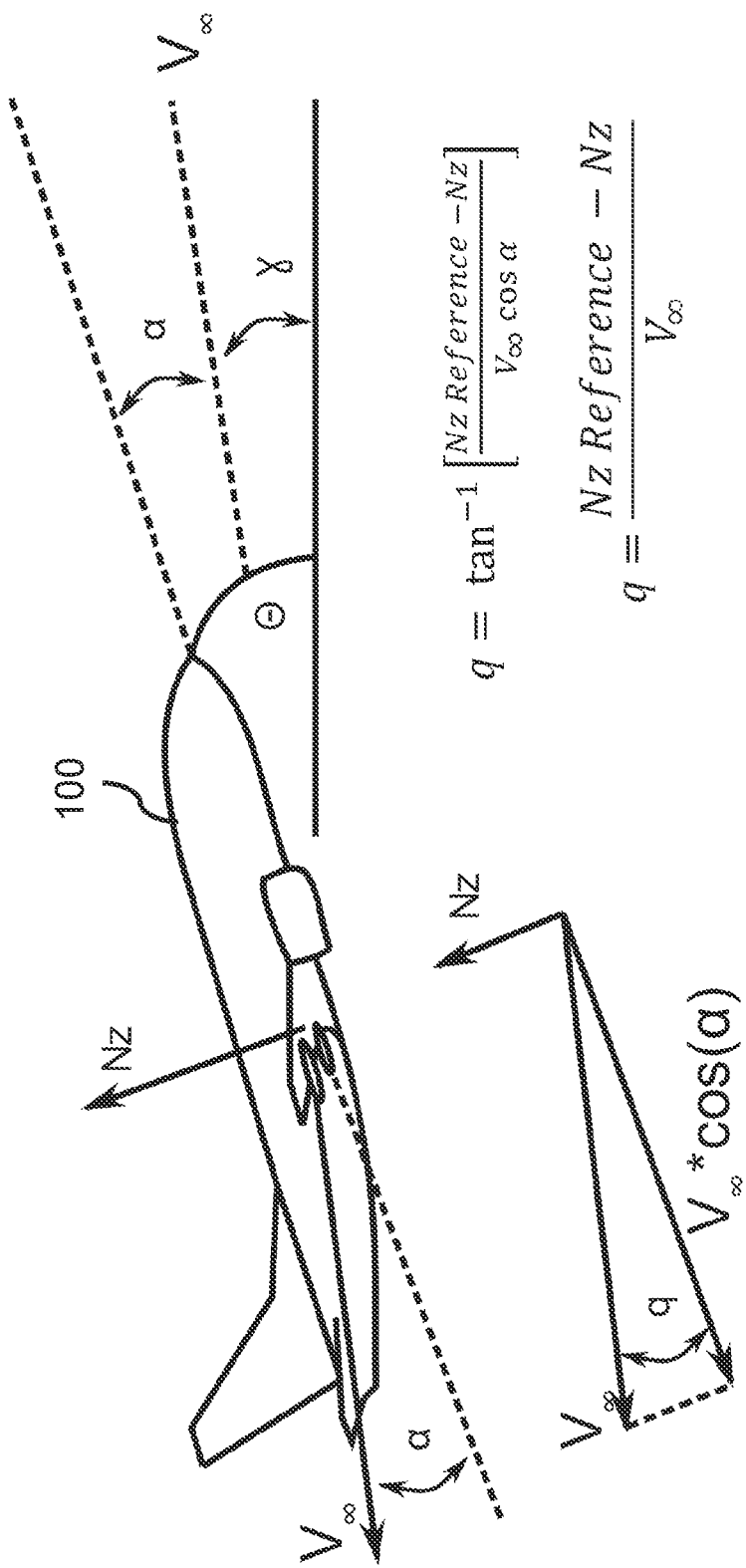
FIG. 4 depicts an aircraft, in accordance with one or more embodiments of the present disclosure.

Referring now to FIG. 4, the aircraft 100 is described in accordance with one or more embodiments of the present disclosure.

Normal acceleration (N) is defined as the linear acceleration of the aircraft 100. The normal acceleration (N) may include the component of the linear acceleration of the aircraft 100 in each of the x-axis, the y-axis, and the z-axis with respect to the reference frame of the aircraft 100. For example, the aircraft 100 may include normal acceleration in the x-axis (Nx), normal acceleration in the y-axis (Ny), and normal acceleration in the z-axis (Nz).

The aircraft 100 may include a reference normal acceleration in the z-axis (NzReference).

The aircraft 100 includes a flight path angle (γ). The flight path angle (γ) is the angle between horizontal and the velocity vector. The flight path angle (γ) describes whether the aircraft 100 is climbing or descending.

Referring now to FIG. 5, conditions 500 of the aircraft 100 are described, in accordance with one or more embodiments of the present disclosure. The aircraft 100 may experience one or more conditions 500. The conditions 500 may be further understood with reference to the flight envelope.

The conditions 500 include unusual attitude conditions when the aircraft 100 is outside of the normal operating envelope 304 for the air transport pilot (ATP). The aircraft 100 is not at steady flight on the horizon when experiencing the unusual attitude conditions. The unusual attitude conditions include a pitch high upset 502, a pitch low upset 504, and a roll high upset 506. The upset condition may also be a combination of pitch and roll upsets.

The pitch high upset 502 is described. The pitch high upset 502 is also referred to as excessive nose up. The pitch high upset 502 is determined based on the pitch angle (θ). The processors 208 trigger the pitch high upset 502 when the pitch angle (θ) is greater than a maximum pitch threshold. For example, the maximum pitch threshold may be 10 degrees, 30 degrees, or the like. The maximum pitch threshold may be based on the certification of the aircraft.

The pitch low upset 504 is described. The pitch low upset 504 is also referred to as excessive nose down. The pitch low upset 504 is determined based on the pitch angle (θ). The processors 208 trigger the pitch low upset 504 when the pitch angle (θ) is less than a minimum pitch threshold. For example, the minimum pitch threshold may be −10 degrees, −45 degrees, or the like. The minimum pitch threshold may be based on the certification of the aircraft.

The roll high upset 506 is described. The roll high upset 506 is also referred to as excessive bank angle. The roll high upset 506 is determined based on the roll angle (?). The processors 208 trigger the roll high upset 506 when an absolute value of the roll angle (φ) is greater than a maximum roll threshold. For example, the maximum roll threshold may be 10 degrees, 45 degrees, 60 degrees, or the like. The maximum roll threshold may be based on the certification of the aircraft. The roll high upset 506 may refer to an inverted upset when the absolute value of the roll angle (φ) is greater than 90 degrees.

The aircraft 100 may be in the pitch high upset 502 in combination with the roll high upset 506. The aircraft 100 may also be in the pitch low upset 504 in combination with the roll high upset 506. The aircraft 100 may also be in the pitch high upset 502 when the absolute value of the roll angle (φ) is less than the maximum roll threshold. The aircraft 100 may also be in the pitch low upset 504 when the absolute value of the roll angle (φ) is less than the maximum roll threshold. The aircraft 100 may also be in the roll high upset 506 when the pitch angle (θ) is within the minimum pitch threshold and the maximum pitch threshold.

The aircraft 100 may also include a level off condition 508. The level off condition 508 refers to when the aircraft 100 is not experiencing the pitch high upset 502, pitch low upset 504, and roll high upset 506. The level off condition 508 is determined based on the pitch angle (θ) and the roll angle (φ). The processors 208 trigger the level off condition 508 when both the pitch angle (θ) is between the minimum pitch threshold and the maximum pitch threshold and the absolute value of the roll angle (φ) is below the maximum roll threshold. For example, the level off condition 508 may be when the pitch angle (θ) is between −5 degrees and 10 degrees and the absolute value of the roll angle (φ) is less than 10 degrees; where the minimum pitch threshold is −5 degrees, the maximum pitch threshold is 10 degrees, and the maximum roll threshold is 10 degrees.

The aircraft 100 may also include an enough speed condition 510. The processors 208 trigger the enough speed condition 510 when a calibrated airspeed (CAS) of the aircraft 100 is greater than a stall speed ($V_{stall}$) of the aircraft. For example, the processors 208 trigger the enough speed condition 510 when the calibrated airspeed (CAS) is 1.3 times greater than a stall speed ($V_{stall}$). The calibrated airspeed (CAS) refers to indicated airspeed corrected for instrument and position error. The stall speed ($V_{stall}$) refers to the minimum speed required for the airplane 100 to produce lift.

The aircraft 100 may also include a stabilized condition 512. The stabilized condition 512 is based on pitch angle (θ), roll angle (φ), roll rate (p), pitch rate (q), normal acceleration in the z-axis (Nz), and Inertial Vertical Speed (HDOT). The processors 208 trigger the stabilized condition 512. For example, the program instructions cause the one or more processors 208 to recover the aircraft 100 to the stabilized condition 512. The stabilized condition occurs when each of the following is true: [1] the absolute value of the pitch angle (θ) is less than a stabilized pitch threshold (e.g., stabilized pitch threshold of 20 degrees); [2] the absolute value of the roll angle (φ) is less than a stabilized roll angle threshold (e.g., stabilized roll angle threshold of 5 degrees); [3] the absolute value of the roll rate (p) is less than a stabilized roll rate threshold (e.g., stabilized roll rate threshold of 5 degrees per second); [4] the absolute value of the pitch rate (q) is less than a stabilized pitch rate threshold (e.g., stabilized pitch rate threshold of 5 degrees per second); [5] the normal acceleration in the z-axis (Nz) is between a stabilized minimum acceleration and a stabilized maximum acceleration (e.g., stabilized minimum acceleration of 0.9 g and stabilized minimum acceleration of 1.1 g); and [6] the Inertial Vertical Speed (HDOT) is within a desired threshold. For example, the desired threshold may be greater than zero. The Inertial Vertical Speed (HDOT) refers to the height that the aircraft 100 ascends per unit of time.

Figure 6:
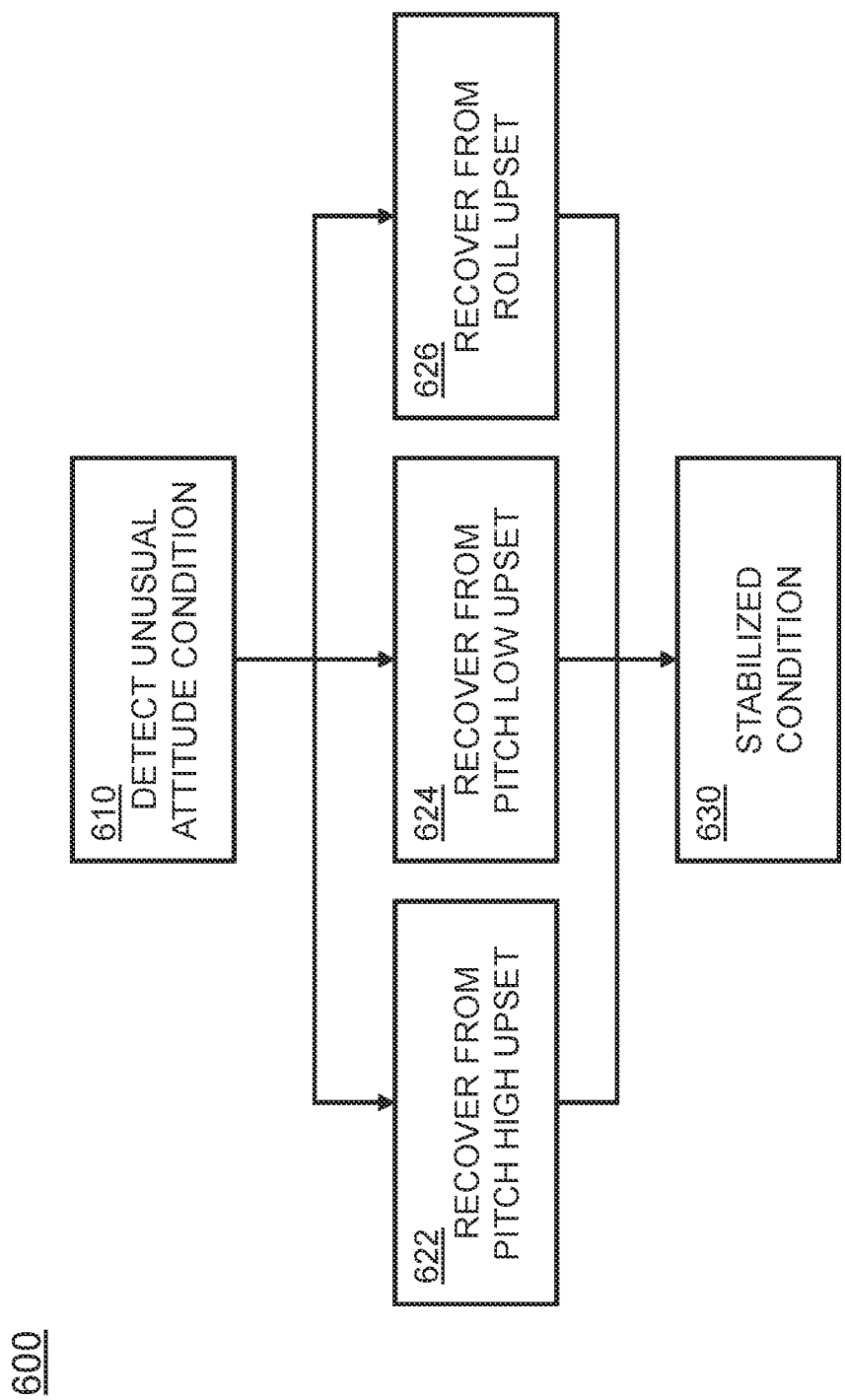
FIG. 6 depicts a flow diagram of a method 600, in accordance with one or more embodiments of the present disclosure.

Referring now to FIG. 6, a flow diagram of a method 600 is described, in accordance with one or more embodiments of the present disclosure. The embodiments and enabling technologies described previously herein in the context of the aircraft 100 should be interpreted to extend to method 600. For example, the processors 208 may perform any of the various steps of the method 600.

A step 610 includes detecting the unusual attitude condition. The unusual attitude condition includes one or more of the pitch high upset 502, a pitch low upset 504, and/or a roll high upset 506. The processors 208 detect the unusual attitude condition. The unusual attitude condition is detected based on one or more of the pitch angle (θ) and/or roll angle (φ). Detecting the unusual attitude condition may also be referred to as an automatic activation condition for an unusual attitude recovery system.

It is further contemplated that the processors 208 may receive a manual activation condition for the unusual attitude recovery system (e.g., receive a signal from the UI elements 104).

A step 622 includes recovering the aircraft 100 from the pitch high upset 502. The step 622 may be further understood with reference to FIG. 7. The step 622 is performed in response to detecting the pitch high upset 502. The step 622 may include both recovering from the pitch high upset 502 and the roll upset 506. The step 610 may include detecting both the pitch high upset 502 and the roll upset 506. The step 622 is performed in response to detecting both the pitch high upset 502 and the roll upset 506. In this regard, the one or more processors are configured to recover the aircraft from the pitch high upset 502 when the absolute value of the roll angle (φ) is less than the maximum roll threshold and also recover the aircraft 100 from the pitch high upset 502 in combination with the roll high upset 506.

A step 624 includes recovering the aircraft 100 from the pitch low upset 504. The step 624 may be further understood with reference to FIG. 8. The step 624 is performed in response to detecting the pitch low upset 504. The step 624 may include both recovering from the pitch low upset 504 and the roll upset 506. The step 610 may include detecting both the pitch low upset 504 and the roll upset 506. The step 624 is performed in response to detecting both the pitch low upset 504 and the roll upset 506. In this regard, the one or more processors are configured to recover the aircraft from the pitch low upset 504 when the absolute value of the roll angle (φ) is less than the maximum roll threshold and also recover the aircraft 100 from the pitch low upset 504 in combination with the roll high upset 506.

A step 626 includes recovering the aircraft 100 from the roll upset 506. The step 626 may be further understood with reference to FIG. 9. The step 626 is performed in response to detecting the roll upset 506. In some embodiments, the step 626 is not performed if either of the pitch high upset 502 or pitch low upset 504 is detected. Instead, the step 622 or the step 624 are performed. In this regard, the one or more processors are configured to recover the aircraft from the roll high upset 506 when the pitch angle (θ) is within a minimum pitch threshold and a maximum pitch threshold.

A step 630 includes recovering the aircraft 100 to the stabilized condition 512. The program instructions cause the one or more processors 208 to recover the aircraft 100 to the stabilized condition 512. The aircraft 100 is in the stabilized condition 512 in response to recovering from the pitch high upset 502, recovering from the pitch low upset 504, and/or recovered from the roll upset 506. Thus, the processors 208 automatically return the aircraft 100 to the stabilized condition 512.

It is further contemplated that the processors 208 may receive a manual deactivation condition for the unusual attitude recovery system (e.g., receive a signal from the UI elements 104).

Figure 7:
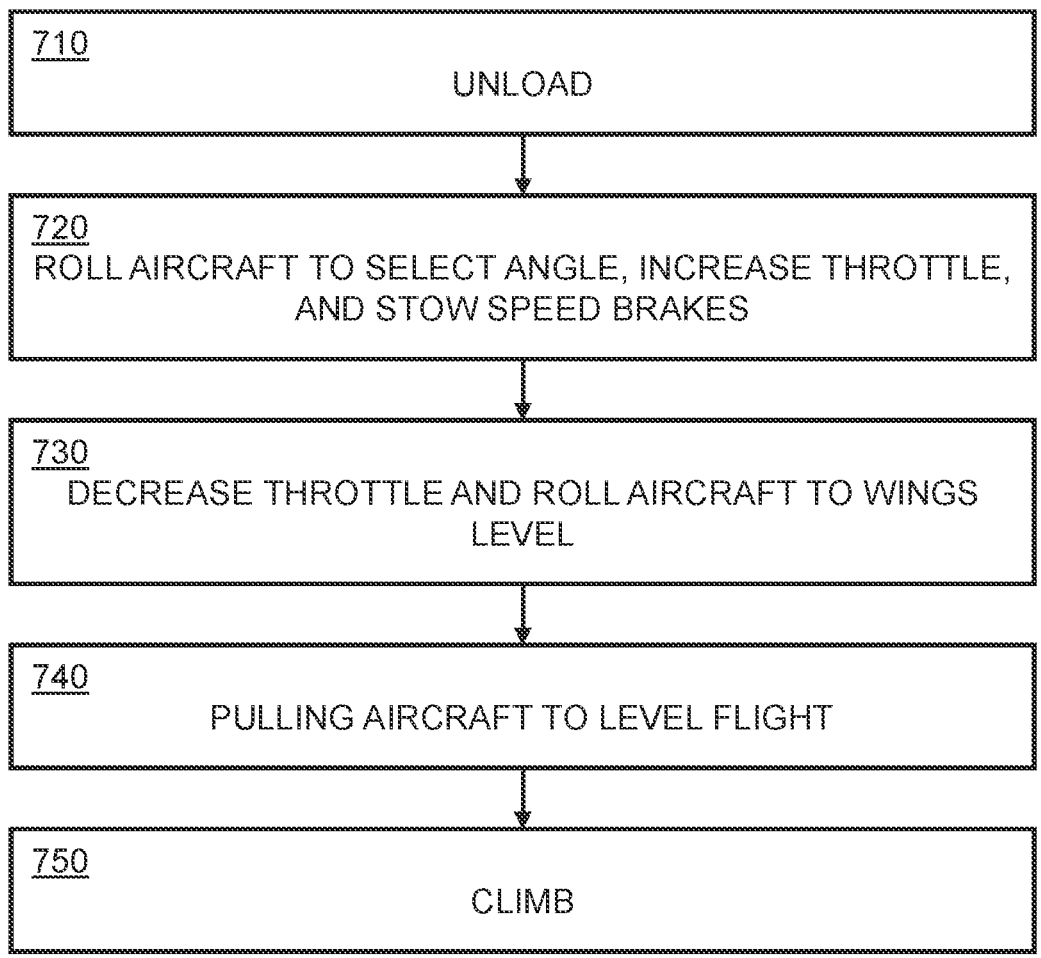
FIG. 7 depicts a flow diagram of recovering an aircraft from a pitch high upset, in accordance with one or more embodiments of the present disclosure.

Referring now to FIG. 7, the step 622 of recovering the aircraft 100 from the pitch high upset 502 is described, in accordance with one or more embodiments of the present disclosure. The recovering from the pitch high upset 502 includes recovering the aircraft 100 from the pitch high upset 502 when the absolute value of the roll angle ($\varphi$) is less than the maximum roll threshold and recovering the aircraft 100 from the pitch high upset 502 in combination with the roll high upset 506.

A step 710 includes unloading the aircraft 100. Unloading the aircraft 100 refers to reduce the lift produced by the wings of the aircraft 100. Unloading the aircraft 100 reduces the load factor (n) close to zeros G-s. Thus, unloading takes the weight off the wings of the aircraft 100. The aircraft 100 is unloaded to achieve a maximum value for the roll rate (p). The aircraft 100 is unloaded by pitching the aircraft 100 and/or lowering the angle-of-attack ($\alpha$). The program instructions cause the one or more processors 208 to unload the aircraft 100 by causing one or more elevators 206a to adjust the pitch angle ($\theta$). Unloading the aircraft refers to reducing a load factor (n) to within a load factor threshold. In some embodiments, unloading the aircraft 100 reduces the load factor (n) to a load factor threshold between 0.5 g and 0.8 g.

A step 720 includes rolling the aircraft 100 to a select roll angle, increasing the throttle 212 of the aircraft 100, and stowing one or more speed brakes 206h in response to unloading the aircraft 100 in the step 710. Rolling the aircraft 100 to a commanded bank to help drop the nose back to the horizon.

In some embodiments, the select roll angle is greater than the maximum roll threshold. For example, the select roll angle may be 70 degrees. Thus, the aircraft 100 is rolled until the roll angle ($\varphi$) is at least 70 degrees. The program instructions cause the processors 208 to roll the aircraft 100 to the select roll angle by actuating the ailerons 206b.

Increasing the throttle 212 of the aircraft 100 increases the power of the aircraft. Increasing the throttle 212 also maintains the airspeed ($V_\infty$) thereby reducing a likelihood of a stall. Similarly, the speed brakes 206h are stowed to prevent losing the airspeed ($V_\infty$) thereby reducing a likelihood of a stall. The throttle 212 may be increased up to a maximum throttle of 100%.

A step 730 includes decreasing the throttle 212 and rolling the aircraft 100 to wings level each as a function of pitch angle ($\theta$) as the pitch angle ($\theta$) decreases to horizon (e.g., decreases to zero). In this regard, the nose of the aircraft 100 returns to horizon. The pitch angle ($\theta$) decreases towards zero as the aircraft 100 returns to horizon. The throttle 212 and the roll angle ($\varphi$) are each controlled as a function of the pitch angle ($\theta$). The throttle 212 and the roll angle ($\varphi$) may also be controlled as a function of the pitch angle ($\theta$) and as a function of pitch rate (q). The processors 208 anticipate when the nose of the aircraft is going to cross the horizon based on the pitch angle ($\theta$) and pitch rate (q). The processors 208 cause the aircraft to start rolling the aircraft level again such that the wings level right when the nose touches the horizon. The aircraft 100 is rolled based on the roll angle ($\varphi$) to wings level or until the ($\varphi$) is zero degrees. The throttle setting is decreased as the airplane 100 moves to horizon. While still unload, roll the wings level as nose approaches horizon. The program instructions cause the processors 208 to roll the aircraft 100 to wings level by controlling the actuation of the ailerons 206b. In some embodiments, the airplane 100 may return from the select roll angle to wings level and nose at horizon within four seconds.

A step 740 includes pulling the aircraft 100 to level flight. The aircraft 100 is pulled to level flight in response to the pitch angle ($\theta$) being at or below horizon. Pulling may also be referred to as pulling the stick. The level flight may refer to the pitch angle ($\theta$) being at horizon. In some embodiments, the aircraft 100 is pulled to level flight up to maximum load factor if needed in response to the pitch angle ($\theta$) being at or below horizon. Pulling to the maximum load factor implies that the aircraft 100 has overshot the wings level condition. The aircraft 100 is pulled to the maximum load factor in response to the pitch angle ($\theta$) of the aircraft 100 being at wings level. Additionally, the aircraft 100 is pulled to the maximum load factor when the aircraft 100 is above a 1.0 g stall speed.

The maximum load factor refers to an aerodynamic limit and/or a structural limit. The maximum load factor may be based on the normal acceleration in the z-axis (Nz). The maximum load factor is above 1 g. For example, the maximum load factor may be between 2 g and 2.5 g. The program instructions causing the one or more processors 208 to pull the aircraft 100 to the maximum load factor by causing one or more elevators 206a to adjust the pitch angle ($\theta$). Pulling the aircraft 100 to level flight causes the pitch angle ($\theta$) to increase. For example, the pitch angle ($\theta$) is negative after the step 730 as the nose of the aircraft is falling. Pulling the aircraft 100 causes the pitch angle ($\theta$) to increase at a positive rate up to horizon. The aircraft is considered in the stabilized condition 512 once the pitch angle ($\theta$) has been increased to horizon. The aircraft 100 may continue flying straight-and-level. However, the aircraft 100 has experienced an altitude loss during the previous steps.

In some embodiments, the step 740 may be delayed if the airspeed ($V_\infty$) is below a stall speed in response to the pitch angle ($\theta$) being at or below horizon. The low speed will cause the aircraft 100 to nose down to regain speed. The step 740 may then be triggered to achieve level flight thereby preventing further altitude loss once the airspeed ($V_\infty$) has been increased above the stall speed.

A step 750 includes causing the aircraft 100 to climb. The aircraft 100 climbs to a target altitude. The processors 208 actuate the elevator 206a causing the aircraft 100 to climb. The processors 208 actuate the elevator 206a based on the pitch rate (q), the flight path angle ($\gamma$), a target flight path angle, the angle-of-attack ($\alpha$), and/or a target angle-of-attack. The processors 208 actuate the elevator 206a up to a maximum pitch angle ($\theta$).

Although the step 622 of recovering aircraft 100 from the pitch high upset 502 is described as including the step 740 of pulling the aircraft to level flight, this is not intended as a limitation of the present disclosure. In some embodiments, the step 750 of causing the aircraft 100 to climb is performed in response to the pitch angle ($\theta$) being at or above horizon. For example, the step 740 may be skipped if the aircraft 100 is experiencing the roll high upset 506 during climb and remains in climb after returning to wings level.

Figure 8:
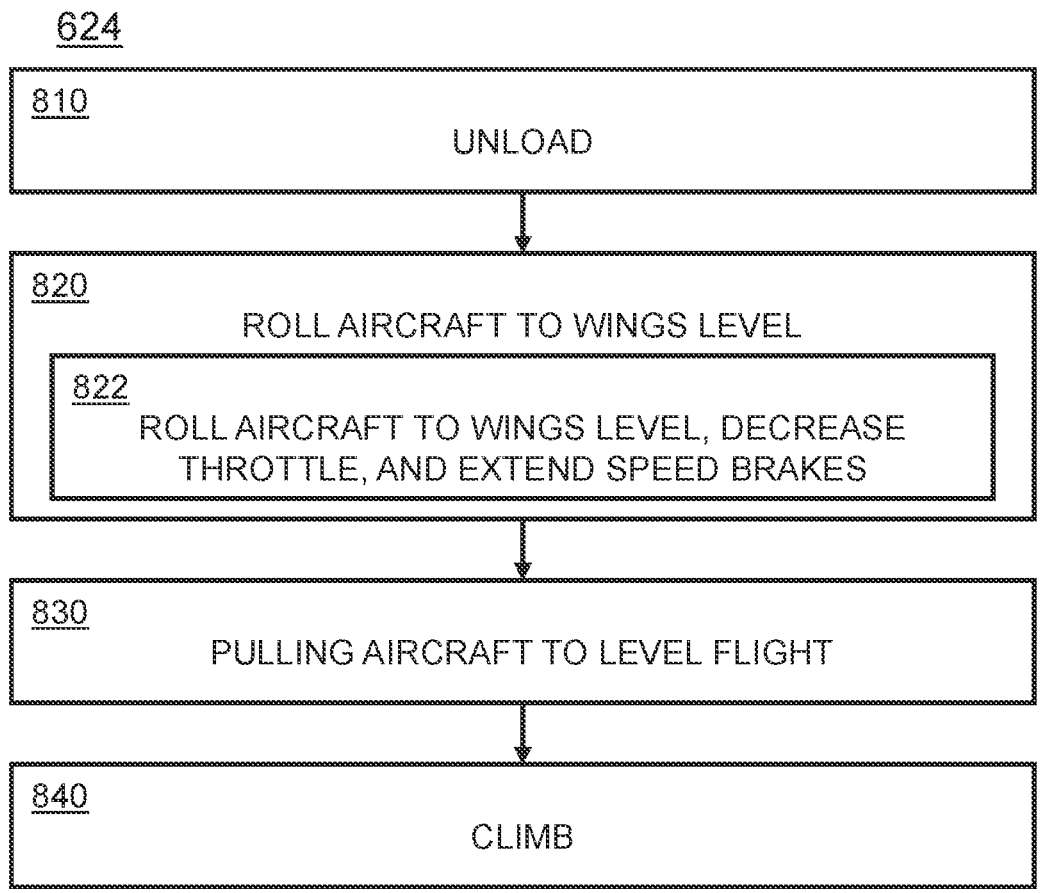
FIG. 8 depicts a flow diagram of recovering an aircraft from a pitch low upset, in accordance with one or more embodiments of the present disclosure.

Referring now to FIG. 8, the step 624 of recovering the aircraft 100 from the pitch low upset 504 is described, in accordance with one or more embodiments of the present disclosure. The recovering from the pitch low upset 504 includes recovering the aircraft 100 from the pitch low upset 504 when the absolute value of the roll angle ($\varphi$) is less than the maximum roll threshold and recovering the aircraft 100 from the pitch low upset 504 in combination with the roll high upset 506.

In a step 810, the aircraft 100 is unloaded.

The step 710 is incorporated herein by reference as to step 810. Unloading the aircraft 100 refers to reduce the lift produced by the wings of the aircraft 100. Unloading the aircraft 100 reduces the load factor (n) close to zeros G-s. Thus, unloading takes the weight off the wings of the aircraft 100. The aircraft 100 is unloaded to achieve a maximum value for the roll rate (p). The aircraft 100 is unloaded by pitching the aircraft 100 and/or lowering the angle-of-attack ($\alpha$). The program instructions cause the one or more processors 208 to unload the aircraft 100 by causing one or more elevators 206a to adjust the pitch angle ($\theta$). In some embodiments, unloading the aircraft 100 reduces the load factor (n) to between 0.5 g and 0.8 g.

A step 820 includes rolling the aircraft 100 to wings level in response to unloading the aircraft 100 in the step 810. Thus, the aircraft 100 is rolled until the roll angle ($\varphi$) is wings leveled within a desired threshold. The aircraft 100 is rolled until the roll angle is less than the absolute value of a threshold. The threshold may include any value, such as, but not limited to, within +/−5 degrees of wings level. The program instructions cause the processors 208 to roll the aircraft 100 to the wings level by actuating the ailerons 206b. The aircraft is rolled to wings level up to a maximum roll rate. The aircraft 100 is pitched downward and rapidly increasing in speed.

In some embodiments, the step 820 includes a step 822 of rolling the aircraft 100 to wings level, decreasing the throttle 212 of the aircraft 100, and extending one or more speed brakes 206h each in response to unloading the aircraft 100 in the step 810. In some embodiments, the rolling the aircraft 100 to wings level, decreasing the throttle 212 of the aircraft 100, and extending one or more speed brakes 206h each in response to unloading the aircraft 100 and in response to detecting the airspeed ($V_\infty$) is above a stall speed. In this regard, the throttle is decreased and the speed brakes are extended only if the aircraft is not in a stall when in the nose-low configuration. Much of the time, the step 822 is performed, as a stall when in the nose-low configuration is unlikely. Decreasing the throttle 212 of the aircraft 100 decreases the power of the aircraft. Decreasing the throttle 212 reduces the increase in airspeed ($V_\infty$) thereby reducing loss in altitude. Similarly, the speed brakes 206h are extended to reduces the increase in airspeed ($V_\infty$) thereby reducing loss in altitude.

A step 830 includes pulling the aircraft 100 to level flight. The aircraft 100 is pulled to level flight in response to the pitch angle ($\theta$) of the aircraft being at wings level. The level flight may refer to the pitch angle ($\theta$) being at horizon. In some embodiments, the aircraft 100 is pulled to level flight up to a maximum load factor in response to the pitch angle ($\theta$) of the aircraft being at wings level.

The step 740 is incorporated herein by reference as to the step 830. The maximum load factor refers to an aerodynamic limit and/or a structural limit. The maximum load factor may be based on the normal acceleration in the z-axis (Nz). The maximum load factor is above 1 g. For example, the maximum load factor may be between 2 g and 2.5 g. The program instructions causing the one or more processors 208 to pull the aircraft 100 to the maximum load factor by causing one or more elevators 206a to adjust the pitch angle ($\theta$). Pulling the aircraft 100 causing the aircraft to the maximum load factor causes the pitch angle ($\theta$) to increase. For example, the pitch angle ($\theta$) is negative after the step 730 as the nose of the aircraft is falling. Pulling the aircraft 100 causes the pitch angle ($\theta$) to increase up to horizon. The aircraft is considered in the stabilized condition 512 once the pitch angle ($\theta$) has been increased to horizon. The aircraft 100 may continue flying straight-and-level. However, the aircraft 100 has experienced an altitude loss during the previous steps.

A step 840 includes causing the aircraft 100 to climb.

The step 750 is incorporated herein by reference as to the step 840. The aircraft 100 climbs to a target altitude or a targeted inertial vertical rate (HDOT). The processors 208 actuate the elevator 206a causing the aircraft 100 to climb. The processors 208 actuate the elevator 206a based on the pitch rate (q), the flight path angle ($\gamma$), a target flight path angle, the angle-of-attack ($\alpha$), and/or a target angle-of-attack. The processors 208 actuate the elevator 206a up to a maximum pitch angle ($\theta$).

Figure 9:
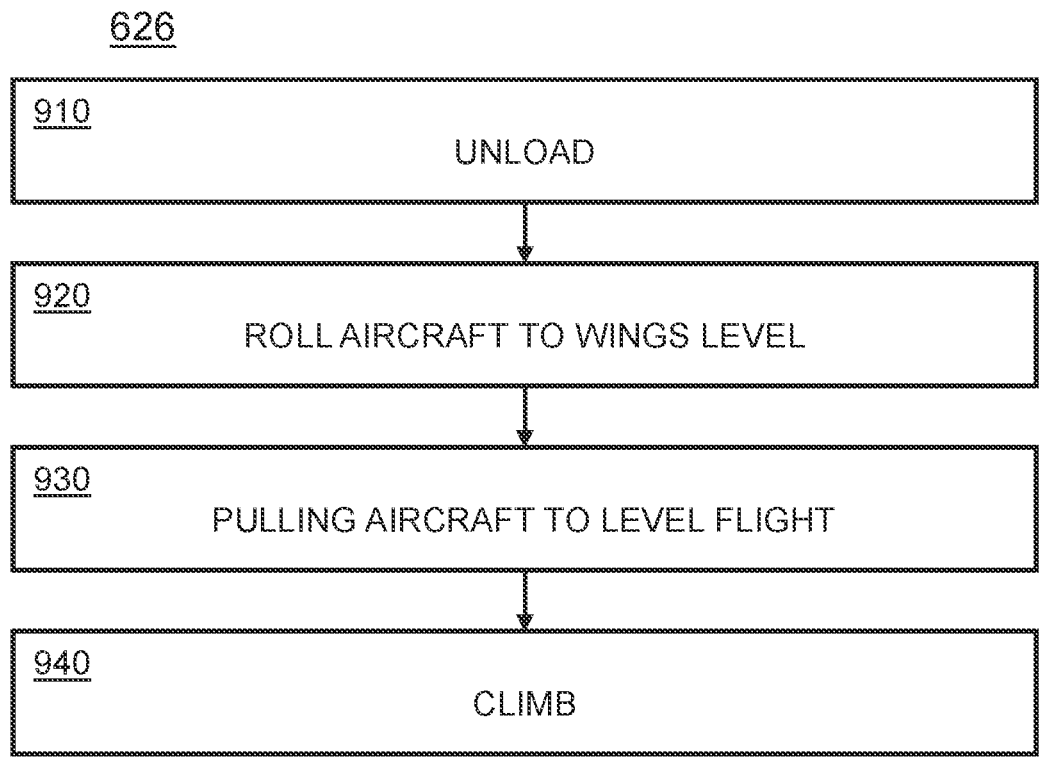
FIG. 9 depicts a flow diagram of recovering an aircraft from a roll upset, in accordance with one or more embodiments of the present disclosure.

Referring now to FIG. 9, the step 626 of recovering the aircraft 100 from the roll upset 506 is described, in accordance with one or more embodiments of the present disclosure. Recovering the aircraft 100 from the roll upset 506 includes recovering from the roll high upset when a pitch angle ($\theta$) is within a minimum pitch threshold and a maximum pitch threshold. If the pitch angle ($\theta$) is below the minimum pitch threshold then the method 800 is performed. If the pitch angle ($\theta$) is above the maximum pitch threshold then the method 700 is performed.

A step 910 includes unloading the aircraft 100.

The step 710 is incorporated herein by reference as to step 910. Unloading the aircraft 100 refers to reduce the lift produced by the wings of the aircraft 100. Unloading the aircraft 100 reduces the load factor (n) close to zeros G-s. Thus, unloading takes the weight off the wings of the aircraft 100. The aircraft 100 is unloaded to achieve a maximum value for the roll rate (p). The aircraft 100 is unloaded by pitching the aircraft 100 and/or lowering the angle-of-attack ($\alpha$). The program instructions cause the one or more processors 208 to unload the aircraft 100 by causing one or more elevators 206a to adjust the pitch angle ($\theta$). In some embodiments, unloading the aircraft 100 reduces the load factor (n) to between 0.5 g and 0.8 g.

A step 920 includes rolling the aircraft to wings level in response to unloading the aircraft 100. Thus, the aircraft 100 is rolled until the roll angle ($\varphi$) wings leveled within a desired threshold. The aircraft 100 is rolled until the roll angle is less than the absolute value of a threshold. The threshold may include any value, such as, but not limited to, within +/−5 degrees of wings level. The program instructions cause the processors 208 to roll the aircraft 100 to the wings level by actuating the ailerons 206b. The aircraft is rolled to wings level up to a maximum roll rate.

A step 930 includes pulling the aircraft 100 to level flight. The aircraft 100 is pulled to level flight in response to the pitch angle ($\theta$) of the aircraft being at wings level. The level flight may refer to the pitch angle ($\theta$) being at horizon. In some embodiments, the aircraft 100 is pulled to level flight up to a maximum load factor in response to the pitch angle ($\theta$) of the aircraft 100 being at wings level.

The step 740 is incorporated herein by reference as to the step 930. The maximum load factor refers to an aerodynamic limit and/or a structural limit. The maximum load factor may be based on the normal acceleration in the z-axis (Nz). The maximum load factor is above 1 g. For example, the maximum load factor may be between 2 g and 2.5 g. The program instructions causing the one or more processors 208 to pull the aircraft 100 to the maximum load factor by causing one or more elevators 206a to adjust the pitch angle ($\theta$). Pulling the aircraft 100 causing the aircraft to the maximum load factor causes the pitch angle ($\theta$) to increase. For example, the pitch angle ($\theta$) is negative after the step 730 as the nose of the aircraft is falling. Pulling the aircraft 100 causes the pitch angle (θ) to increase at a positive rate up to horizon. The aircraft is considered in the stabilized condition 512 once the pitch angle (θ) has been increased to horizon. The aircraft 100 may continue flying straight-and-level. However, the aircraft 100 has experienced an altitude loss during the previous steps.

A step 940 includes causing the aircraft 100 to climb.

The step 750 is incorporated herein by reference as to the step 940. The aircraft 100 climbs to a target altitude. The processors 208 actuate the elevator 206a causing the aircraft 100 to climb. The processors 208 actuate the elevator 206a based on the pitch rate (q), the flight path angle (γ), a target flight path angle, the angle-of-attack (α), and/or a target angle-of-attack. The processors 208 actuate the elevator 206a up to a maximum pitch angle (θ).

Although recovering the aircraft 100 from the roll upset condition is described as including the step 930 of pulling the aircraft 100 up to the maximum load factor in response to the pitch angle (θ) of the aircraft being at wings level, this is not intended as a limitation of the present disclosure. The aircraft 100 is only pulled up to the maximum load factor if the pitch angle (θ) is less than the minimum pitch threshold, causing the aircraft 100 to enter the pitch low upset 504 condition. It is contemplated that the step 940 of causing the aircraft 100 to climb may be performed in response to the pitch angle (θ) of the aircraft being at wings level when the pitch angle (θ) is greater than the minimum pitch threshold.

Referring now to FIG. 10, a block diagram of an upset recovery manager 1000 is described in accordance with one or more embodiments of the present disclosure. The program instructions cause the processors 208 to implement the upset recovery manager 1000. The upset recovery manager 1000 is a state-based machine.

The upset recovery manager 1000 is a closed-loop controller which uses feedback to control states of the aircraft 100 via outputs from the control states. The upset recovery manager 1000 includes one or more states. The states of the Upset Recovery Manager 1000 correspond to a current state of the aircraft 100. The states include an activated state, deactivated state, high pitch upset state, low pitch upset state, roll upset state, level off state, stabilize state. The activated state is generated upon receiving an activate signal. The activate signal is generated upon detecting the upset condition or receiving a command from the UI elements 104. The deactivated state is generated upon receiving a deactivate signal. The deactivate signal is generated in response to either a command from the pilot to deactivate or when the control laws indicate the aircraft is within the normal envelope.

Recovery performance is measured based on altitude loss and meeting desired attitude rate/load limits and is also based on aircraft type. The upset recovery manager 1000 executes control laws. For example, the controls laws include a Roll controller 1002, a Climb controller 1004, and Unload/Pull controller 1006, Airspeed and Angle-of-Attack controller 1008, Elevator controller 1010, State controller 1012, and the like.

The Roll controller 1002 may be a Roll Proportional/Derivative Controller. The Roll controller 1002 roll the aircraft 100 to a desired roll angle. For example, the Roll controller 1002 rolls the aircraft to wings level once the aircraft 100 is unloaded. The Roll controller 1002 command a roll to assist in dropping the nose for high pitch upsets. The Roll controller 1002 includes a Roll error proportional command. The Roll controller 1002 includes a Roll target. The Roll target is 0 degrees for wings level or command a roll for pitch down assist. The roll command for high pitch upsets is created as a function of pitch. The roll command is proportional to the pitch. A Roll target direction (left or right) is chosen based on roll rate.

The Climb controller 1004 may be a Flight Path Angle Proportional/Derivative Controller. The Climb controller 1004 may also be referred to as a Flight path angle controller. The Climb controller 1004 controller includes an energy-based function. The Climb controller 1004 use Vstall as target to drive target γ during Level Off part of the recovery. The Climb controller 1004 generated a desired γ-command as quick and smooth as possible. The Climb controller 1004 may be considered a Proportional/Derivative controller on γ-Error. The Climb controller 1004 limits an elevator command as a function of max allowable q (based on Nz limits).

The Unload/Pull controller 1006 may also be referred to as a Push/Pull controller. The Unload/Pull controller 1006 may be a Normal Acceleration Proportional/Derivative Controller. The Unload/Pull controller 1006 includes a gain scheduler. The gain scheduler improves tracking performance during Unload and Pull phases. The Unload/Pull controller 1006 does not include a gravity term in a target pitch rate calculation. The Unload/Pull controller 1006 uses a Nz command to unload or pull as quick and smooth as possible. The Unload/Pull controller 1006 is a Proportional/Derivative controller on Nz Error (proportional and derivative). The Gain of the Nz Error path may be tuned to capture a Nz smoothly. The proportional path generates a pitch rate command to hold a desired Nz. The pitch rate command to hold the desired Nz is generated to account for speed changes. Three primary paths are summed to generate the Push/Pull Nz command: proportional path on pitch rate error, integrated pitch rate error, and Pitch Rate Damping. The integrated pitch rate error translates to a pitch error. The Unload/Pull controller 1006 generates a pitch rate command based on a desired Nz. Nz error must have 1 g removed from the command feedback so that an Nz=0 gets a q target of 0. A triangle is created from Nz & $V_\infty$ using small angle approximation to define the pitch rate target is defined as Q=(Nz Reference−Nz)/$V_\infty$. Integrating the pitch rate error yields a smooth response to achieving the Nz target. Using a pitch rate error proportional gain helps 'boost' the command to reach a Nz target quicker. Limiting this command path reduces overshoot. The rate deriving damping path on pitch rate is needed to help smooth the Nz capture.

The Airspeed and Angle-of-Attack controller 1008 prevent/protect against low airspeed or high angle of attack. The Airspeed and Angle-of-Attack controller 1008 may be a minimum command comparator to the Unload/Pull/FPA Claws based on low airspeed or high AoA. The Airspeed and Angle-of-Attack controller 1008 creates a target normalized airspeed (desired value above Vstall) and AoA (desired value of stall AoA). When the aircraft airspeed passes outside a desired region, a pitch command is integrated to track back into the desired region.

The Elevator controller 1010 keeps commands to the elevators 206a within structural load limits of the aircraft 100. The Elevator controller 1010 rate limits the pitch command based on max allowable q (function of Nz). In embodiments, the processors 208 pull the aircraft 100 to a g-target. The processors 208 may include a G-controller with the g-target. The g-target is converted to an elevator command.

The State controller 1012 transitions the upset recovery manager 1000 between Push/Pull and Roll Modes. The State controller 1012 includes triggering Logic to drives the state transitions between the two primary modes: PitchMode, RollMode.

The Pitch Modes include 1—Standby (Inactive); 2—Unload Requirements: None, default state when upset recovery is activated; 3—Pull 4—Level Off and 5—Stabilize.

The Roll modes include 1—Standby (Inactive); 2—Initialize: Decision Point for either a wings level or commanded roll maneuver; 3—Wings Level; 4—Command Roll and 5—Stabilize.

Referring generally again to FIGS. 1-10.

The aircraft 100 is depicted as including one of the processing circuits 100. Although the aircraft 100 is depicted as including one of the processing circuits 100, this is not intended as a limitation of the present disclosure. The aircraft 100 may include at least two of the processing circuits 100. The least two of the processing circuits 202 may be considered multi redundant for the upset recovery system.

The sensors 204 may include, for example, one or more devices or instruments configured for tracking airspeed (e.g., pitot-static system) and/or location (e.g., GPS). The sensors 204 may include one or more sensors configured to acquire data indicative of speed (e.g., indicated airspeed, a true airspeed, and groundspeed), an angle of attack, a pitch angle, a flight path angle, an acceleration, a rate of descent, and/or an altitude. The sensors 204 may include air data sensors. The air data sensors may include airspeed, altitude, and angle of attack sensors configured for measuring air data parameters. Air data sensors may further monitor an Air Data Computer (ADC) stability, a rate of change of each air data parameter, a Radio Altimeter (RA), and an Attitude Heading reference System (AHRS). The sensors 204 may include hydraulics sensors. The hydraulics sensors may function to monitor hydraulic pressure used to actuate the control surfaces 206.

The sensors 204 may include control surface sensors. The control surface sensors may include a plurality of sensors including a mechanical position of each of the control surface 206. The sensors 204 can detect, generate, and output sensor data regarding the platform and an environment about the aircraft 100, including altitude and energy state variables, such as speed and acceleration. The sensors 204 can include various sensors, including but not limited to an inertial measurement unit (which may include one or more gyroscopes and one or more accelerometers, such as three gyroscopes and three accelerometers), an air data sensor (e.g., sensor(s) configured to detect and output an indication of static pressure), a magnetic compass, a navigation system, a vision system (e.g., a camera, an infrared image sensor, a LIDAR), a global navigation satellite system (GNSS), a weather radar system (e.g., a weather radar configured to output Doppler measurements), an altimeter, a true airspeed sensor, or an indicated airspeed sensor. The sensors 204 can include one or more of an inertial measurement unit, a GPS device, a global navigation satellite system receiver, an altimeter, a gyroscope, a magnetic compass, an accelerometer, a temperature sensor, a vision system (e.g., a camera, an infrared image sensor, a LIDAR), or an air data sensor (e.g., sensor(s) configured to detect and output an indication of static pressure). In some embodiments, the sensors 204 include an attitude and heading reference system or an inertial reference system.

A circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices, processors, or the like).

The methods, operations, and/or functionality disclosed may be implemented as sets of instructions or software readable by a device. The steps may include computations which may be performed simultaneously, in parallel, or sequentially. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A processing circuit comprising:
    a memory maintaining program instructions; and
    one or more processors configured to execute the program instructions causing the one or more processors to recover an aircraft from each of:
        a pitch high upset when an absolute value of a roll angle ($\varphi$) is less than a maximum roll threshold;
        the pitch high upset in combination with a roll high upset;
        a pitch low upset when the absolute value of the roll angle ($\varphi$) is less than the maximum roll threshold;
        the pitch low upset in combination with the roll high upset; and
        the roll high upset when a pitch angle ($\theta$) is within a minimum pitch threshold and a maximum pitch threshold;

wherein recovering the aircraft from the pitch low upset when the absolute value of the roll angle ($\varphi$) is less than the maximum roll threshold and recovering the aircraft from the pitch low upset in combination with the roll high upset each comprise:
    unloading the aircraft;
    rolling the aircraft to wings level in response to unloading the aircraft; and
    pulling the aircraft to a level flight in response to the pitch angle ($\theta$) of the aircraft being at wings level.

2. The processing circuit of claim 1, wherein the program instructions cause the one or more processors to:
    trigger the pitch high upset when the pitch angle ($\theta$) is greater than the maximum pitch threshold;
    trigger the pitch low upset when the pitch angle ($\theta$) is less than the minimum pitch threshold; and
    trigger the roll high upset when the absolute value of the roll angle ($\varphi$) is greater than the maximum roll threshold.

3. The processing circuit of claim 1, wherein recovering the aircraft from the pitch high upset when the absolute value of the roll angle ($\varphi$) is less than the maximum roll threshold and recovering the aircraft from the pitch high upset in combination with the roll high upset each comprise:
    unloading the aircraft;
    rolling the aircraft to a select roll angle, increasing a throttle, and stowing one or more speed brakes each in response to unloading the aircraft;
    decreasing the throttle and rolling the aircraft to wings level each as a function of the pitch angle ($\theta$) as the pitch angle ($\theta$) decreases to horizon; and
    pulling the aircraft to the level flight in response to the pitch angle ($\theta$) being at or below horizon.

4. The processing circuit of claim 3, wherein the select roll angle is greater than the maximum roll threshold.

5. The processing circuit of claim 1, wherein recovering the aircraft from the pitch low upset when the absolute value of the roll angle ($\varphi$) is less than the maximum roll threshold and recovering the aircraft from the pitch low upset in combination with the roll high upset each comprise: rolling the aircraft to wings level, decreasing a throttle, and extending one or more speed brakes each in response to unloading the aircraft.

6. The processing circuit of claim 1, wherein recovering the aircraft from the roll high upset when the pitch angle ($\theta$) is within the minimum pitch threshold and the maximum pitch threshold comprises:
    unloading the aircraft;
    rolling the aircraft to wings level in response to unloading the aircraft; and
    pulling the aircraft to the level flight in response to the pitch angle ($\theta$) of the aircraft being at wings level.

7. The processing circuit of claim 1, the program instructions causing the one or more processors to unload the aircraft by causing one or more elevators to adjust the pitch angle ($\theta$).

8. The processing circuit of claim 7, wherein unloading the aircraft refers to reduces a load factor (n) to within a load factor threshold.

9. The processing circuit of claim 1, the program instructions causing the one or more processors to roll the aircraft by causing one or more ailerons to adjust the roll angle ($\varphi$).

10. The processing circuit of claim 1, the program instructions causing the one or more processors to pull the aircraft to the level flight by causing one or more elevators to adjust the pitch angle ($\theta$); wherein pulling the aircraft to the level flight causes the pitch angle ($\theta$) to increase.

11. The processing circuit of claim 1, wherein the program instructions cause the one or more processors to recover the aircraft to a stabilized condition.

12. The processing circuit of claim 11, wherein the stabilized condition occurs when:
    an absolute value of the pitch angle ($\theta$) is less than a stabilized pitch threshold;
    the absolute value of the roll angle ($\varphi$) is less than a stabilized roll angle threshold;
    an absolute value of a roll rate (p) is less than a stabilized roll rate threshold;
    an absolute value of a pitch rate (q) is less than a stabilized pitch rate threshold;
    a normal acceleration in the z-axis (Nz) is between a stabilized minimum acceleration and a stabilized maximum acceleration; and
    an Inertial Vertical Speed (HDOT) is greater than zero.

13. The processing circuit of claim 1, wherein the program instructions cause the one or more processors to execute an upset recovery manager; wherein the upset recovery manager is a state-based machine.

14. The processing circuit of claim 13, the upset recovery manager comprising a roll controller, a climb controller, an unload/pull controller, an airspeed and angle-of-attack controller, an elevator controller, and a state controller.

15. An aircraft comprising:
    a throttle;
    one or more control surfaces comprising:
        one or more rudders;
        one or more elevators; and
        one or more ailerons; and
    a processing circuit comprising:
        a memory maintaining program instructions; and
        one or more processors configured to execute the program instructions causing the one or more processors to recover the aircraft from each of:
            a pitch high upset when an absolute value of a roll angle ($\varphi$) is less than a maximum roll threshold;
            the pitch high upset in combination with a roll high upset;
            a pitch low upset when the absolute value of the roll angle ($\varphi$) is less than the maximum roll threshold;
            the pitch low upset in combination with the roll high upset; and
            the roll high upset when a pitch angle ($\theta$) is within a minimum pitch threshold and a maximum pitch threshold;
    wherein recovering the aircraft from the pitch low upset when the absolute value of the roll angle ($\varphi$) is less than the maximum roll threshold and recovering the aircraft from the pitch low upset in combination with the roll high upset each comprise:
        unloading the aircraft;
        rolling the aircraft to wings level in response to unloading the aircraft; and
        pulling the aircraft to a level flight in response to the pitch angle ($\theta$) of the aircraft being at wings level.

16. A processing circuit comprising:
    a memory maintaining program instructions; and
    one or more processors configured to execute the program instructions causing the one or more processors to recover an aircraft from each of:
        a pitch high upset when an absolute value of a roll angle ($\varphi$) is less than a maximum roll threshold;
        the pitch high upset in combination with a roll high upset;

a pitch low upset when the absolute value of the roll angle (φ) is less than the maximum roll threshold;

the pitch low upset in combination with the roll high upset; and the roll high upset when a pitch angle (θ) is within a minimum pitch threshold and a maximum pitch threshold;

wherein recovering the aircraft from the pitch high upset when the absolute value of the roll angle (φ) is less than the maximum roll threshold and recovering the aircraft from the pitch high upset in combination with the roll high upset each comprise:

unloading the aircraft;

rolling the aircraft to a select roll angle, increasing a throttle, and stowing one or more speed brakes each in response to unloading the aircraft;

decreasing the throttle and rolling the aircraft to wings level each as a function of the pitch angle (θ) as the pitch angle (θ) decreases to horizon; and pulling the aircraft to a level flight in response to the pitch angle (θ) being at or below horizon.

17. A processing circuit comprising:
a memory maintaining program instructions; and
one or more processors configured to execute the program instructions causing the one or more processors to recover an aircraft from each of:

a pitch high upset when an absolute value of a roll angle (φ) is less than a maximum roll threshold;

the pitch high upset in combination with a roll high upset;

a pitch low upset when the absolute value of the roll angle (φ) is less than the maximum roll threshold;

the pitch low upset in combination with the roll high upset; and the roll high upset when a pitch angle (θ) is within a minimum pitch threshold and a maximum pitch threshold;

wherein recovering the aircraft from the roll high upset when the pitch angle (θ) is within the minimum pitch threshold and the maximum pitch threshold comprises:

unloading the aircraft;

rolling the aircraft to wings level in response to unloading the aircraft; and pulling the aircraft to a level flight in response to the pitch angle (θ) of the aircraft being at wings level.

* * * * *